United States Patent
Shibata et al.

[11] 3,909,606
[45] Sept. 30, 1975

[54] DIGITALLY CONTROLLED-OPERATING SYSTEM

[75] Inventors: Akira Shibata, Okazaki; Atutoshi Okamoto, Toyohashi, both of Japan

[73] Assignee: Nippondenso Co., Ltd., Kariya, Japan

[22] Filed: Mar. 6, 1974

[21] Appl. No.: 448,645

[30] Foreign Application Priority Data
Mar. 7, 1973   Japan ............................ 48-27506

[52] U.S. Cl. ........ 235/153 R; 180/105 E; 303/21 P; 303/21 CF
[51] Int. Cl.² ......................................... B60T 8/02
[58] Field of Search ................ 235/153 A, 153 R; 303/21 AF, 21 P, 21 BE, 21 CF; 180/82 R, 105 E; 188/181 C; 340/52 B; 317/5; 324/161; 328/140; 307/233 B

[56] References Cited
UNITED STATES PATENTS

| | | | |
|---|---|---|---|
| 3,744,854 | 7/1973 | Ooya et al. | 303/21 P |
| 3,750,101 | 7/1973 | Granlund | 340/52 B |
| 3,780,346 | 12/1973 | Gagnon | 317/5 |
| 3,818,433 | 6/1974 | Okamoto et al. | 303/21 AF |

Primary Examiner—Charles E. Atkinson
Attorney, Agent, or Firm—Cushman, Darby & Cushman

[57] ABSTRACT

A digitally controlled-operating system comprising a detecting means such as a speed sensor which generates pulses having a frequency corresponding to a detected value, an oscillation circuit consisting of a multivibrator which stops oscillation when the frequency of detected pulses from said detecting means exceeds a predetermined value while it maintains oscillation when the frequency is below the predetermined value, and a logical gate which opens and closes a gate in accordance with the output pulse signal from said oscillation circuit to control the on-off of said detected pulses from said detecting means, the digital operation being performed by the output signal from said logical gate.

When this system is applied to an antiskid means, a malfunction occurring just after supplying electric power can be prevented.

6 Claims, 5 Drawing Figures

DIGITALLY CONTROLLED-OPERATING SYSTEM

BACKGROUND OF THE INVENTION

1. Field of the Invention

This invention relates to a digitally controlled-operating system (hereinafter referred to as a computer) which provides a circuit having both initial setting and detecting effects and performs digital operation with the pulses from a detecting means like a speed sensor as its input, and more particularly to a digitally controlled-operating system in which the computer can be set at an arbitrary value immediately after supplying an electric power when the frequency of detected pulses is below a predetermined value.

2. Description of the Prior Art

In a digital computer as used in the antiskid means of a car, an undesired cancellation signal for braking pressure (hereinafter referred to as a releasing signal) is often generated depending on the output state of flip-flop circuits after supplying the electric power, losing thereby the braking ability of the car. For example, as disclosed in an antiskid control system of U.S. Pat. No. 3,608,978, the flip-flop circuits provide such functions as momentary memory on the way of digital operation in a computer and converting the digital operating values to time pulses with time width in proportion to the digital operating values to prescribe the loosening time of braking pressure. In order to remove this defect and set the output state of all the flip-flop circuits at a predetermined state, it has been necessary to provide a set circuit for each flip-flop circuit and a synchronizing circuit for making all the set circuits to operate synchronously. In other words, it is necessary to attach a set circuit to the resistor which is a constituent element of a computer, the set circuit consisting of an initial value recording circuit which can record an arbitrary value and of a load signal generating circuit. Further, it is necessary to provide a set circuit to a counter of the computer, such as a reset signal generating circuit being capable of resetting the counter. These set and reset circuits are different for individual flip-flop circuits. Thus, there is such a defect that the set and reset circuits together with the synchronous circuits have made the whole circuit complicated.

SUMMARY OF THE INVENTION

An object of this invention is to eliminate the above-mentioned drawback and to provide a digitally controlled-operating system which is simple and inexpensive. For this purpose, there is provided a detecting means which generates detecting pulses with a frequency corresponding to the detected value, an oscillation circuit whose oscillation action is stopped when the frequency of the detecting pulses exceeds a predetermined value, while being under the operation when the frequency is below the predetermined value, and a logical element having a logical gate being opened and closed by the oscillation pulses from the output of this oscillation circuit thereby to pass and cut-off the detecting pulses to the computer, whereby the digital operation is performed by the output signal from this logical gate. Thus, when the frequency of the detecting pulses is below the predetermined value just after supplying the electric power, the initial value of the computer can be set by oscillating pulses from the oscillation circuit. All the set circuits attached to the flip-flop circuits in the conventional digital operation circuit are no longer required. And another object of the present invention is to provide a much simpler circuit without provision of a set circuit in a conventional digital circuit for setting its initial value.

A further object of the present invention is to provide a circuit employed in an antiskid control system for preventing an erroneous signal of releasing a braking pressure from being generated at its system at an instance when the system is supplied with the electric power.

According to the present invention it is possible to dispense with a set circuit required for a conventional digitally controlled-operating system to set the initial condition of the latter and to thereby simplify the overall construction of the digitally controlled-operating system, which can bring such advantages of raising the reliability of the circuit and reducing the manufacturing cost thereof.

Furthermore, according to the present invention it is possible to eliminate a serious drawback of losing braking controllability of a vehicle caused by an undesirable braking fluid pressure releasing signal generated by an unstable circuit condition immediately after supplying of electric power, as seen in a conventional digitally controlled-operating system employed in an antiskid device for vehicles, which can bring such an excellent advantage of raising reliability of an antiskid device for vehicles and hence safety of vehicle driving.

DESCRIPTION OF THE PREFERRED EMBODIMENT

Figure 1:
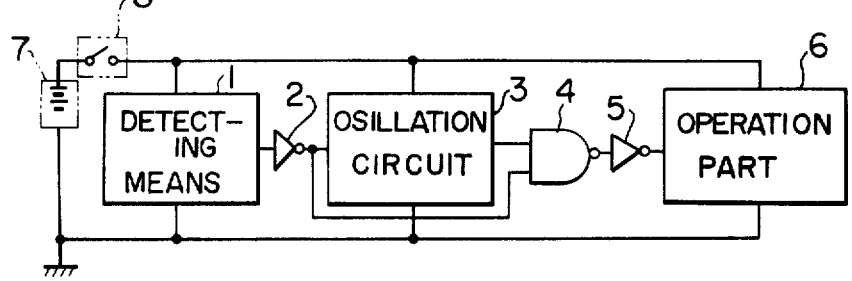
FIG. 1 is a block diagram showing one embodiment of digitally controlled-operating systems according to this invention.

In FIG. 1, there is shown a block diagram of a digitally controlled-operating system demonstrating a case where this invention is applied to an antiskid control means. In this figure, numeral 1 designates a detecting circuit (speed sensor) which generates detecting pulses with a frequency corresponding to the rotation speed of a wheel, numerals 2 and 5 NOT circuits, 3 an oscillation circuit, 4 a two-input NAND gate, 6 an operation part such as an antiskid control system, 7 an electric power supply, and 8 a power supply switch. Immediately after supplying the electric power by closing the power supply switch 8, the output of the NOT circuit 2 becomes "1" if the frequency of detecting pulses from the detecting means 1 is zero. This output is applied to one input terminal of said NAND gate 4 to open the gate. Since at this time the output of the NOT circuit 2 is "1," the oscillation circuit 3 generates oscillation pulses with a certain frequency. These pulses are applied to the other input terminal of said NAND gate 4. Therefore, these oscillating pulses pass through the NAND gate 4 and the NOT circuit 5 and arrive at the operation part 6, thereby setting the operation part 6 at an initial value determined by the frequency of the oscillation pulses. In the figure, the power supply lines and the earth lines for the NOT circuits 2 and 5 and the NAND gate 4 etc. are omitted.

Figure 2:
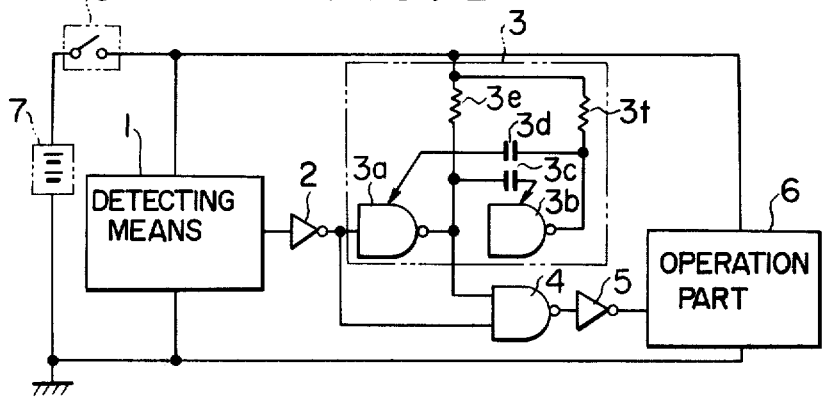
FIG. 2 is an electric circuit showing the main part in detail of the first embodiment.

In FIG. 2 showing a first embodiment of the present invention, the numeral 3 designates a well-known astable multivibrator consisting of NAND gates $3a$ and $3b$ with expander capacitors $3c$ and $3d$ and resistors $3e$ and $3f$. When the output of the NOT circuit 2 is "1," the multivibrator starts its operation to generate oscillation pulses with a constant frequency determined by the capacitors $3c$ and $3d$. The electric power supply 7 has a voltage of +5V.

Figure 5:
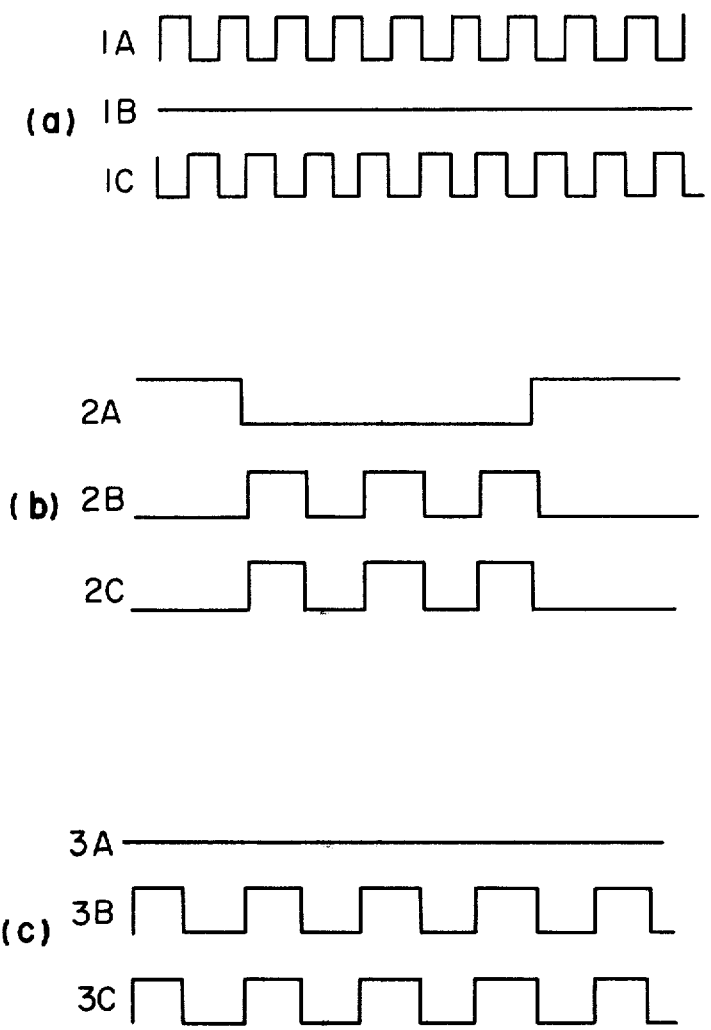
FIG. 5 shows time charts for explaining the operation of the invention.

Next, an operation will be described with respect to FIG. 5 showing time charts. Immediately after supplying the electric power by closing the power supply switch 8, if the frequency of the detecting pulses from the detecting means 1 is zero, resulting in appearance of "1" signal at the output of the NOT circuit 2, the astable multivibrator 3 generates oscillation pulses with a constant frequency. These oscillation pulses pass through the NAND gate 4 and the NOT circuit 5 and arrive at the operation part 6, thereby setting the operation circuit 6 at a constant initial value. The waveform at each part in the above-mentioned operation is shown in FIG. $5(c)$, where 3A shows output detecting pulses of the detecting means 1, 3B shows the output oscillation pulses of the astable multivibrator 3, and 3C shows the output pulses of the NOT circuit 5. When a vehicle starts to move, detecting pulses with a frequency proportional to the rotation speed of the wheel are generated from the detecting means 1. At this stage when the frequency of the detecting pulses is lower than that of the astable multivibrator determined by capacitors $3c$ and $3d$, and furthermore, when the output detecting pulses from the detecting means 1 are in the state "0" the oscillation pulses are generated and applied to the operation part 6 through the NAND gate 4 and the NOT circuit 5. The waveform at each part in the abovementioned operation is shown in FIG. $5(b)$, where 2A shows output detecting pulses of the detecting means 1, 2B shows output oscillation pulses of the astable multivibrator 3, and 2C shows output pulses of the NOT circuit 5. Further, as the car is accelerated to such a speed that the frequency of the detecting pulses from the detecting means 1 becomes higher than that of the astable multivibrator 3, the multivibrator stops its oscillating operation, thereby to constantly generate a high level signal "1" at its output. Accordingly, the detecting pulses from the detecting means 1, passing through the NAND gate 4 and the NOT circuit 5, are inverted in their phases and applied to the operation part 6. The waveform at each part in the above-mentioned operation is shown in FIG. $5(a)$, where 1A shows output detecting pulses from the detecting means 1, 1B shows output oscillation pulses of the astable multivibrator 3 and $1c$ shows output pulses of the NOT circuit 5.

As apparent from the above described operation, when the frequency of the detecting pulses of the detecting means 1 exceeds a predetermined value, the oscillating operation of the astable multivibrator 3 is stopped and the detecting pulses are applied to the operation part 6 as its input signal, thereby performing a normal digital operation. On the other hand, when the frequency of the detecting pulses is below the predetermined value just after supplying the electric power, the oscillation pulses from the astable multivibrator 3 are applied to the operation part 6, whereby the operation part 6 operates by employing the oscillation pulses at its initial value, thereby setting the initial value of the operation part 6 at an arbitrary value.

Therefore, when the operation part 6 may be employed in the digital computer of the antiskid control system for producing the braking pressure releasing signal, the frequency of the oscillation pulses from the astable multivibrator 3 should be chosen at a sufficiently lower value so as not to influence on the operating performance in producing said releasing signal. In this manner, the erroneous generation of the releasing signal occurring just after supplying the electric power is prevented.

Figure 3:
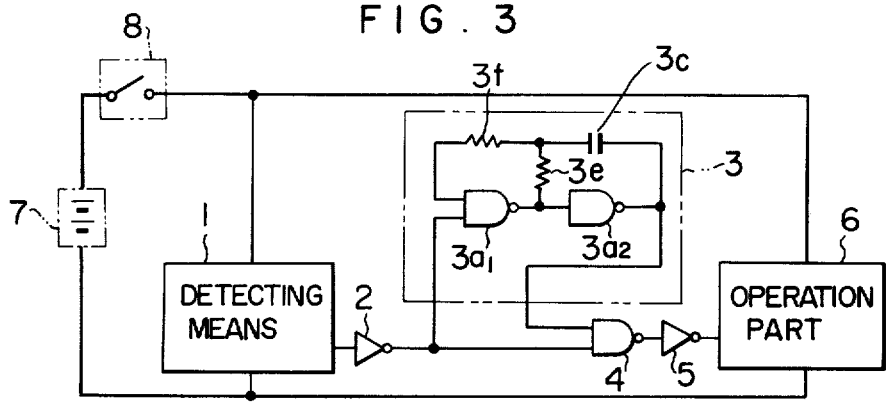
FIGS. 3 and 4 are electric circuits showing the main part of the second and third embodiments of this invention.
Figure 4:
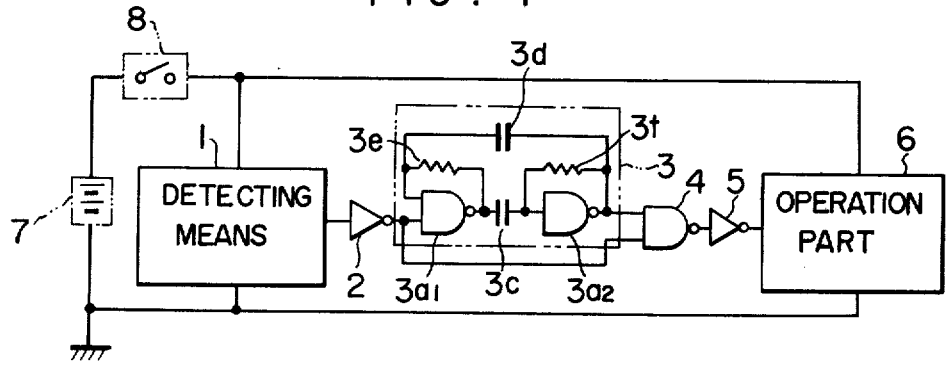

Next, referring to FIGS. 3 and 4 showing the second and third embodiments of the present invention, where $3a_1$ and $3a_2$ are NAND gates forming an astable multivibrator 3. These two embodiments employ commercially sold integrated circuits. While the first embodiment in FIG. 2 employs DTL integrated circuits, the second embodiment of FIG. 3 employs CMOS integrated circuits and the third embodiment of FIG. 4 employs TTL integrated circuits. One tip of a commercially solid integrated circuit includes four NAND gates. Since both second and third embodiments employ one type of integrated circuit and one NOT circuit, the circuit arrangement can be made simple and of small size, whereas the second and third embodiments can perform the same function as that of the first embodiment of FIG. 1.

Although in the above embodiments only digitally operating means for the antiskid control system is exemplified, this invention may be applied to various digitally operating means which have flip-flop circuits therein to perform a digital operation.

Further, another method may be used as a means for effecting the oscillation of astable multivibrator 3 when the frequency of detecting pulses from the detecting means 1 is below a predetermined value ans stopping the oscillation when the frequency is above the predetermined value. Namely, the frequency of the detecting pulses may be converted to either an analog or a digital value, which is then compared with a predetermined value by a comparator, and this output of the comparator may be used to control the oscillation action of the astable multivibrator.

We claim:
1. A digitally controlled-operating system comprising:

detecting means for generating detecting pulses with a frequency corresponding to a detected value;

an oscillation circuit connected to said detecting means for generating oscillation pulses with a certain frequency when said frequency of said detecting pulses is lower than a predetermined value and for stopping its oscillating operation when said frequency of the detecting pulses exceeds said predetermined value;

a logical circuit means having input terminals connected to said detecting means and said oscillation circuit and a gate for controlling on-off operation of said gate to produce signals at said gate in accordance with said oscillating pulses; and an operation part connected to said logical circuit means for starting its operation upon receipt of said signals.

2. A digitally controlled-operating system according to claim 1, wherein said detecting means is a speed sensor which generates detecting pulses having a frequency corresponding to the speed of a wheel.

3. A digitally controlled-operating system according to claim 2, wherein said oscillation circuit is an astable multivibrator.

4. A digitally controlled-operating system according to claim 2 further comprising:
- a NOT gate connected between said speed sensor and said astable multivibrator which starts its oscillating operation with a high level signal at its input terminal for inverting the output of said speed sensor, said logical circuit being a NAND gate.

5. A digitally controlled-operating system according to claim 2, wherein said operation part is a digital computer employed in the antiskid control system.

6. A digitally controlled, antiskid braking system for an automobile comprising:
- means for sensing the speed of wheel rotation and producing a pulse train having a frequency which varies as a function thereof,
- means for generating a train of pulses at a given frequency,
- logic means for applying the pulse train from said sensing means to said generating means so that said generating means is prevented from generating pulses when the frequency of the pulses from said sensing means is greater than a predetermined frequency indicating normal operation and permitted to generate pulses when the frequency of the pulses from said sensing means is less than said predetermined frequency, and
- logic means for applying the outputs of said sensing and generating means to an antiskid signal producing means.

* * * * *